United States Patent
Hemmi et al.

(10) Patent No.: US 9,670,957 B2
(45) Date of Patent: Jun. 6, 2017

(54) TILTING-PAD THRUST BEARING AND ROTARY MACHINE HAVING THE SAME

(71) Applicant: Mitsubishi Hitachi Power Systems, Ltd., Yokohama, Kanagawa (JP)

(72) Inventors: Makoto Hemmi, Tokyo (JP); Kenichi Murata, Yokohama (JP); Kenta Suzuki, Tokyo (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 395 days.

(21) Appl. No.: 14/533,468

(22) Filed: Nov. 5, 2014

(65) Prior Publication Data
US 2015/0132105 A1 May 14, 2015

(30) Foreign Application Priority Data

Nov. 8, 2013 (JP) .................................. 2013-232028

(51) Int. Cl.
| | | |
|---|---|---|
| *F16C 17/06* | (2006.01) | |
| *F16C 33/10* | (2006.01) | |
| *F04D 29/041* | (2006.01) | |

(52) U.S. Cl.
CPC ...... *F16C 33/1065* (2013.01); *F04D 29/0413* (2013.01); *F16C 17/06* (2013.01); *F16C 33/1085* (2013.01); *F16C 2300/34* (2013.01)

(58) Field of Classification Search
CPC ... F16C 33/1065; F16C 17/06; F16C 33/1085
See application file for complete search history.

(56) References Cited

U.S. PATENT DOCUMENTS

| | | | | |
|---|---|---|---|---|
| 3,905,657 A | * | 9/1975 | Ishida .................. | F03B 11/066 384/307 |
| 5,702,186 A | * | 12/1997 | Hackstie ............. | F16C 33/1065 384/117 |
| 9,169,866 B2 | * | 10/2015 | Sato ...................... | F16C 37/002 |
| 9,377,051 B2 | * | 6/2016 | Hemmi ................ | F16C 17/107 |

(Continued)

FOREIGN PATENT DOCUMENTS

| | | |
|---|---|---|
| EP | 0 064 598 A1 | 11/1982 |
| JP | 59-96422 U | 6/1984 |
| JP | 2012-117608 A | 6/2012 |

OTHER PUBLICATIONS

European Search Report dated May 7, 2015 (Eight (8) pages).

*Primary Examiner* — Thomas R. Hannon
(74) *Attorney, Agent, or Firm* — Crowell & Moring LLP

(57) ABSTRACT

The invention provides a tilting-pad thrust bearing that requires less oil supply and a rotary machine having the same. A tilting-pad thrust bearing 100 comprises: multiple oil inlets 10 disposed in spaces between pads 6; multiple outflow guide grooves 12 each formed near the inner circumferential edge of the sliding surface of the pad 6 such that the outflow guide grooves 12 extend in a circumferential direction; and multiple inflow guide grooves 13 provided separately from the outflow guide grooves 12 and formed at the leading ends of the sliding surfaces of the pads 6 so as to be located more radially inward than the oil inlets 10. Each outflow guide groove 12 is open to the sliding surface and the trailing end surface of the pad 6. Each inflow guide grooves 13 is open to the leading end surface and the sliding surface of the pad 6.

11 Claims, 8 Drawing Sheets

(56) References Cited

U.S. PATENT DOCUMENTS

2002/0110295 A1    8/2002   Miller
2015/0159692 A1*   6/2015   Dourlens ................ F16C 17/03
                                                                                                     384/192

* cited by examiner

TILTING-PAD THRUST BEARING AND ROTARY MACHINE HAVING THE SAME

BACKGROUND OF THE INVENTION

1. Field of the Invention

The present invention relates to a tilting-pad thrust bearing and a rotary machine having the same.

2. Description of the Related Art

Typically, a steam turbine used in a thermal power plant or the like is connected to a power generator via a rotary shaft extending horizontally. To support the radial load of the shaft including its weight, multiple journal bearings are used. In a steam turbine, the hydrodynamic force fluctuates according to the rotational speed and load status of the rotary shaft, which causes the shaft to produce an axial load. For this reason, a thrust bearing is used to support the axial load of the shaft and prevent axial displacement of the shaft.

As thrust bearings having high load capabilities, tilting-pad thrust bearings are known. The tilting-pad thrust bearing disclosed in JP-2012-117608-A comprises: multiple pads swayably disposed on the outer circumferential side of a rotary shaft so as to face a thrust collar; and multiple oil feed sections disposed in spaces between the pads. While the thrust collar rotates, lubricating oil flows through the orifices of the oil feed sections into spaces between the thrust collar and the sliding surfaces of the pads to form oil films. These oil films help to support an axial load.

SUMMARY OF THE INVENTION

However, the foregoing technology leaves room for improvement. Though not stated explicitly in the above patent literature, the lubricating oil supplied to the spaces between the thrust collar and the sliding surfaces of the pads flows out not only from the trailing end of each pad (i.e., the downstream circumferential side) but also from the outer circumferential end (i.e., the radially outer side) and the inner circumferential end (i.e., the radially inner side) of each pad. Because the oil flowing out from the outer and inner circumferential ends of each pad is drained out of the bearing, oil needs to be supplied for the amount drained. Thus, there is room for improvement in terms of the amount of oil supply.

An object of the present invention is thus to provide a tilting-pad thrust bearing that requires less oil supply and a rotary machine having the same.

To achieve the above object, a first aspect of the invention is a tilting-pad thrust bearing for supporting the axial load of a rotary shaft via a thrust collar fixed to the outer circumferential side of the rotary shaft, the bearing comprising: a plurality of pads swayably disposed on the outer circumferential side of the rotary shaft so as to face the thrust collar; a plurality of oil inlets disposed in spaces between the plurality of pads or at leading end sections of sliding surfaces of the pads; a plurality of outflow guide grooves formed on the sliding surfaces of the pads and each located at a position closer to an inner circumferential edge of the sliding surface of the pad than a width-directional center of the sliding surface of the pad such that the plurality of outflow guide grooves extend in a circumferential direction; and a plurality of inflow guide grooves provided separately from the plurality of outflow guide grooves and formed at the leading end sections of the sliding surfaces of the pads so as to be located more radially inward than the plurality of oil inlets, wherein each of the outflow guide grooves is open to the sliding surface and a trailing end surface of the pad, wherein each of the inflow guide grooves is open to a leading end surface of the pad so as to form an opening wide enough to include the same radial position as that of the opening of the outflow guide groove on the trailing end surface of the pad, and wherein each of the inflow guide grooves is also open to the sliding surface of the pad so as to form an opening wide enough to cover a radially outer area than the radial position of the outflow guide groove on the sliding surface of the pad.

In the first aspect of the invention, each of the outflow guide grooves prevents lubricating oil from flowing out from the inner circumferential edge of a pad and directs the oil toward the trailing end of the pad (i.e., toward the leading end of a next downstream pad). Moreover, the inflow guide groove of the downstream pad allows the oil flowing out from the outflow guide groove of the upstream pad, which has a relatively low temperature, to be supplied onto the sliding surface of the downstream pad. Thus, the amount of oil supply can be reduced.

To achieve the foregoing object, a second aspect of the invention is a tilting-pad thrust bearing for supporting the axial load of a rotary shaft via a thrust collar fixed to the outer circumferential side of the rotary shaft, the bearing comprising: a plurality of pads swayably disposed on the outer circumferential side of the rotary shaft so as to face the thrust collar; a plurality of oil inlets disposed in spaces between the plurality of pads or at leading end sections of sliding surfaces of the pads; a plurality of outflow guide grooves formed on the sliding surfaces of the pads and each located at a position closer to an outer circumferential edge of the sliding surface of the pad than a width-directional center of the sliding surface of the pad such that the plurality of outflow guide grooves extend in a circumferential direction; and a plurality of inflow guide grooves provided separately from the plurality of outflow guide grooves and formed at the leading end sections of the sliding surfaces of the pads so as to be located more radially outward than the plurality of oil inlets, wherein each of the outflow guide grooves is open to the sliding surface and a trailing end surface of the pad, wherein each of the inflow guide grooves is open to a leading end surface of the pad so as to form an opening wide enough to include the same radial position as that of the opening of the outflow guide groove on the trailing end surface of the pad, and wherein each of the inflow guide grooves is also open to the sliding surface of the pad so as to form an opening wide enough to cover a radially inner area than the radial position of the outflow guide groove on the sliding surface of the pad.

In the second aspect of the invention, each of the outflow guide grooves prevents lubricating oil from flowing out from the outer circumferential edge of a pad and directs the oil toward the trailing end of the pad (i.e., toward the leading end of a next downstream pad). Moreover, the inflow guide groove of the downstream pad allows the oil flowing out from the outflow guide groove of the upstream pad, which has a relatively low temperature, to be supplied onto the sliding surface of the downstream pad. Thus, the amount of oil supply can be reduced.

To achieve the foregoing object, a third aspect of the invention is a tilting-pad thrust bearing for supporting the axial load of a rotary shaft via a thrust collar fixed to the outer circumferential side of the rotary shaft, the bearing comprising: a plurality of pads swayably disposed on the outer circumferential side of the rotary shaft so as to face the thrust collar; a plurality of oil inlets disposed in spaces between the plurality of pads or at leading end sections of sliding surfaces of the pads; a plurality of first outflow guide grooves formed on the sliding surfaces of the pads and each located at a position closer to an inner circumferential edge of the sliding surface of the pad than a width-directional center of the sliding surface of the pad such that the plurality of first outflow guide grooves extend in a circumferential direction; a plurality of first inflow guide grooves provided separately from the plurality of first outflow guide grooves and formed at the leading end sections of the sliding surfaces of the pads so as to be located more radially inward than the plurality of oil inlets; a plurality of second outflow guide grooves formed on the sliding surfaces of the pads and each located at a position closer to an outer circumferential edge of the sliding surface of the pad than the width-directional center of the sliding surface of the pad such that the plurality of second outflow guide grooves extend in a circumferential direction; and a plurality of second inflow guide grooves provided separately from the plurality of second outflow guide grooves and formed at the leading end sections of the sliding surfaces of the pads so as to be located more radially outward than the plurality of oil inlets, wherein each of the first outflow guide grooves is open to the sliding surface and a trailing end surface of the pad, wherein each of the first inflow guide grooves is open to a leading end surface of the pad so as to form an opening wide enough to include the same radial position as that of the opening of the first outflow guide groove on the trailing end surface of the pad, wherein each of the first inflow guide grooves is also open to the sliding surface of the pad so as to form an opening wide enough to cover a radially outer area than the radial position of the first outflow guide groove on the sliding surface of the pad, wherein each of the second outflow guide grooves is open to the sliding surface and the trailing end surface of the pad, wherein each of the second inflow guide grooves is open to the leading end surface of the pad so as to form an opening wide enough to include the same radial position as that of the opening of the second outflow guide groove on the trailing end surface of the pad, and wherein each of the second inflow guide grooves is also open to the sliding surface of the pad so as to form an opening wide enough to cover a radially inner area than the radial position of the second outflow guide groove on the sliding surface of the pad.

In the third aspect of the invention, each pair of the first and second outflow guide grooves prevents lubricating oil from flowing out from the inner and outer circumferential edges of a pad and directs the oil toward the trailing end of the pad (i.e., toward the leading end of a next downstream pad). Moreover, the first and second inflow guide grooves of the downstream pad allow the oil flowing out from the first and second outflow guide grooves of the upstream pad, which has a relatively low temperature, to be supplied onto the sliding surface of the downstream pad. Thus, the amount of oil supply can be reduced.

In accordance with the present invention, the amount of oil supply can be reduced.

DESCRIPTION OF THE PREFERRED EMBODIMENTS

Embodiment 1 of the present invention will now be described with reference to the accompanying drawings.

Figure 1:
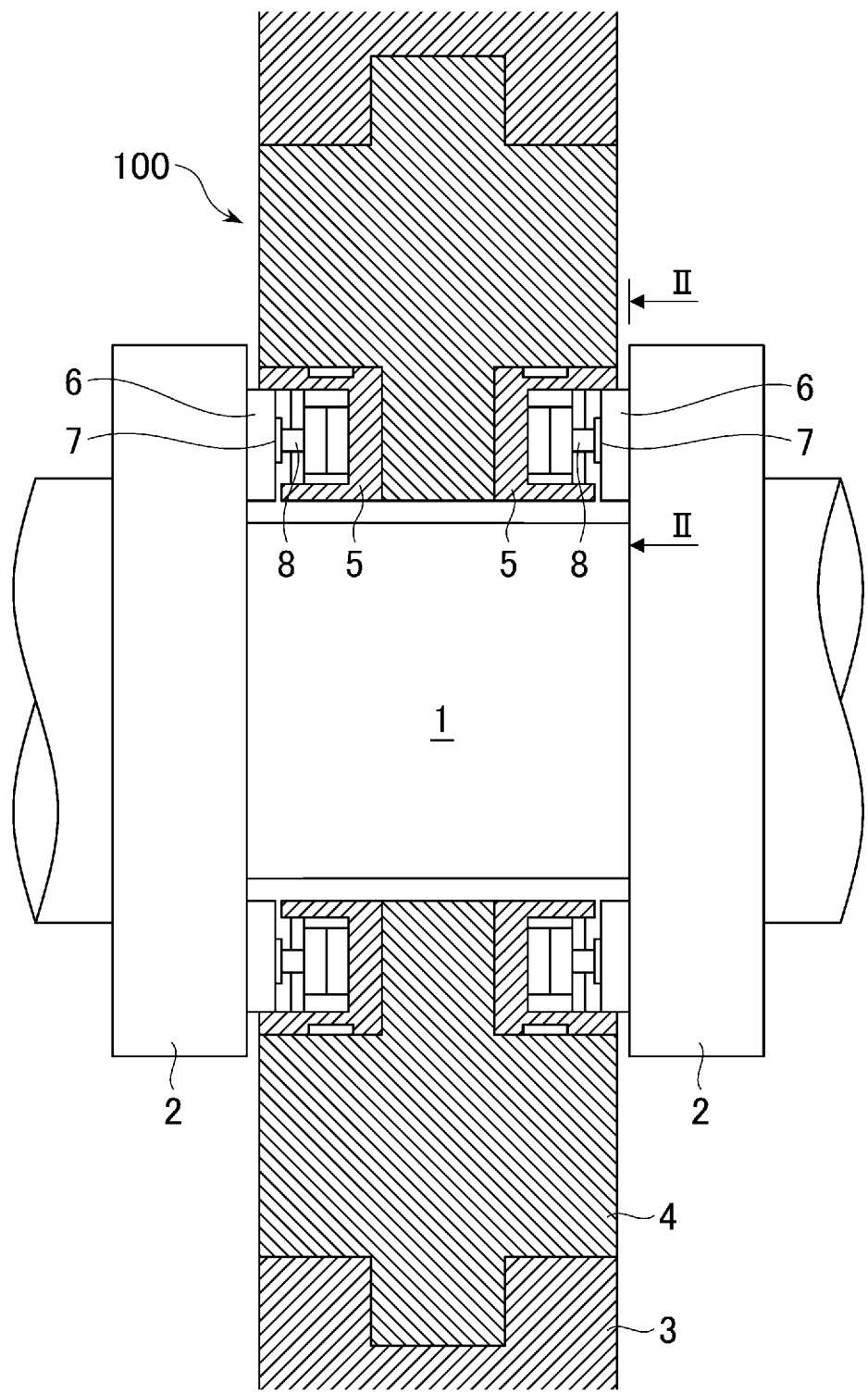
FIG. 1 is an axial cross section illustrating the structure of a tilting-pad thrust bearing according to Embodiment 1 of the invention.
Figure 2:
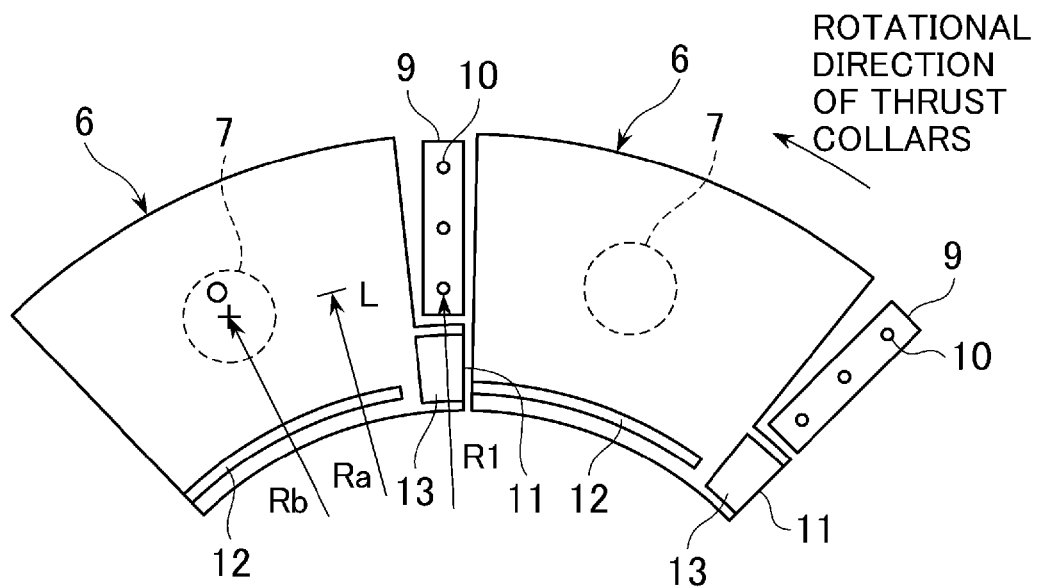
FIG. 2 illustrates the structure of pads according to Embodiment 1.
Figure 3:
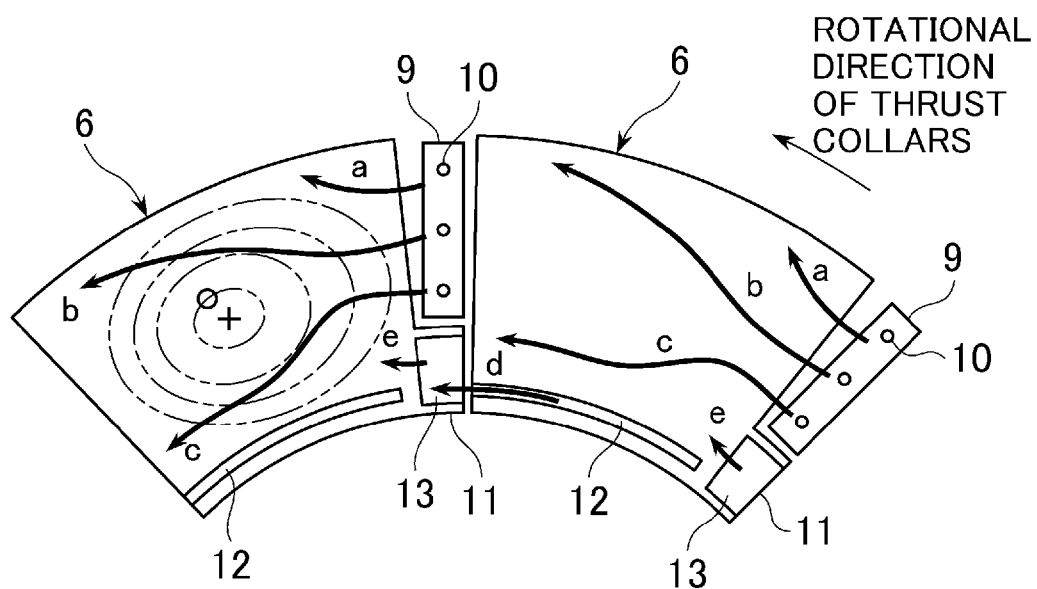
FIG. 3 illustrates the pressure of oil films on the sliding surfaces of the pads and the flow of lubricating oil according to Embodiment 1.

FIG. 1 is an axial cross section illustrating the structure of a tilting-pad thrust bearing according to Embodiment 1. FIG. 2 is a cross-sectional view in the direction of arrows II of FIG. 1, illustrating the structure of pads according to Embodiment 1 (only two pads and only two oil pipes are shown for the sake of convenience). FIG. 3 illustrates the pressure of oil films on the sliding surfaces of the pads and the flow of lubricating oil.

With reference to FIG. 1, a rotary shaft 1 is disposed so as to extend horizontally (i.e., in the left and right direction of FIG. 1). The rotary shaft 1 has a pair of thrust collars 2 fixed to its outer circumference; thus, the rotary shaft 1 and the thrust collars 2 rotate together. The tilting-pad thrust bearing, designated by 100, receives the axial load of the rotary shaft 1 via the thrust collars 2.

The thrust bearing 100 includes the following components: a substantially ring-shaped bearing housing 4 fixed to a pedestal 3; two substantially ring-shaped bearing bases 5, one of the bases 5 being internally fixed on one side of the housing 4 in terms of the axial direction (on the right side of FIG. 1), the other being internally fixed on the other side of the housing 4 (on the left side of FIG. 1); and multiple pads 6. In the present embodiment, eight pads 6 are arranged along the circumference of one of the bases 5 (i.e., on the outer circumferential side of the rotary shaft 1) so as to face one of the thrust collars 2. Likewise, eight pads 6 are arranged along the circumference of the other base 5 (i.e., on the outer circumferential side of the rotary shaft 1) so as to face the other thrust collar 2. Each of the pads 6 has a pivot 7 attached to its back side, and the pivot 7 is in contact with a pivot base 8. Thus, each of the pads 6 is supported in a swayable manner.

As illustrated in FIG. 2, oil pipes 9 are disposed in spaces between the pads 6. Each of the oil pipes 9 has multiple (three in the present embodiment) oil inlets 10 (i.e., nozzle orifices) arranged at intervals in a radial direction of the rotary shaft 1. Note that each of the oil pipes 9 is disposed at a radially outward position so as not to interfere with a leading end projection 11 located at the radially inward leading end of the pad 6. The outermost oil inlet 10 is located at a radially outer position than the width-directional center L of the pad 6 or the center O of the swaying motion of the pad 6 (i.e., the center of the pivot 7). On the other hand, the innermost oil inlet 10 is located at a radially inner position than the width-directional center L or the swaying motion center O of the pad 6 (in other words, R1<Ra<Rb as in FIG. 2).

All the oil pipes 9 are connected to a pump (not illustrated) via oil passageways (not illustrated) formed within the bearing housing 4. The pump pressurizes lubricating oil, which is ejected through the oil inlets 10 of the oil pipes 9 toward the thrust collars 2. While the thrust collars 2 rotate, the oil enters spaces between the thrust collars 2 and the sliding surfaces of the pads 6 (i.e., the surfaces facing the thrust collars 2). This causes the pads 6 to sway, and the spaces between the sliding surfaces of the pads 6 and the thrust collars 2 become gradually smaller in the rotational direction of the thrust collars 2. Thus, dynamic pressure is generated due to the wedge effect, producing oil films. The two-dot chain lines of FIG. 3 represent lines of equal oil-film pressure, and the pressure distribution at the swaying motion center O has the largest pressure. The presence of oil films allows for supporting the axial load of the rotary shaft 1 via the thrust collars 2 without interfering with the rotation of the thrust collars 2 (as well as the rotation of the rotary shaft 1).

However, the lubricating oil supplied to the sliding surfaces of the pads 6 from the oil inlets 10 of the oil pipes 9 tends to partially drift away toward the outer and inner circumferential sides of the pads 6 due to the foregoing distribution of the oil film pressure.

Thus, in the present embodiment, each of the pads 6 has an outflow guide groove 12. The outflow guide groove 12 is formed near the inner circumferential edge of the sliding surface of the pad 6 (i.e., at a position closer to the inner circumferential edge than the width-directional center L) such that it extends in a circumferential direction. The outflow guide groove 12 is open to the sliding surface and the trailing end surface of the pad 6. Each of the pads 6 also has an inflow guide groove 13 separated from the outflow guide groove 12. The inflow guide groove 13 is formed at the leading end projection 11 of the pad 6 (i.e., at the leading end section of the sliding surface of the pad 6) such that it is located at a radially inner position than the oil inlets 10 of the oil pipe 9. The inflow guide groove 13 is open to the leading end surface of the pad 6 so as to form an opening wide enough to include the same radial position as that of the opening of the outflow guide groove 12 on the trailing end surface of the pad 6. The inflow guide groove 13 is also open to the sliding surface of the pad 6 so as to form an opening wide enough to cover a radially outer area than the radial position of the outflow guide groove 12 on the sliding surface of the pad 6.

The arrows a, b, c, and d of FIG. 3 represent the resultant oil flow. As illustrated by the arrows a, part of the oil supplied to the sliding surface of a pad 6 drifts toward the outer circumferential side of the pad 6 and flows out from the outer circumferential edge of the pad 6. As illustrated by the arrows b, part of the oil supplied to the sliding surface of a pad 6 slightly drifts toward the outer circumferential side of the pad 6 but flows out from the trailing end of the pad 6. As illustrated by the arrows c, part of the oil supplied to the sliding surface of a pad 6 slightly drifts toward the inner circumferential side of the pad 6 but flows out from the trailing end of the pad 6. As illustrated by the arrow d, part of the oil supplied to the sliding surface of a pad 6 drifts toward the inner circumferential side of the pad 6 but flows out from the trailing end of the pad 6 through the outflow guide groove 12. The oil flowing out through the outflow guide groove 12 has a relatively low temperature. Finally, as illustrated by the arrows e, the oil flowing out from the outflow guide groove 12 of an upstream pad 6 flows through the inflow guide groove 13 of a next downstream pad 6, reaching the sliding surface of that downstream pad 6.

Figure 4:
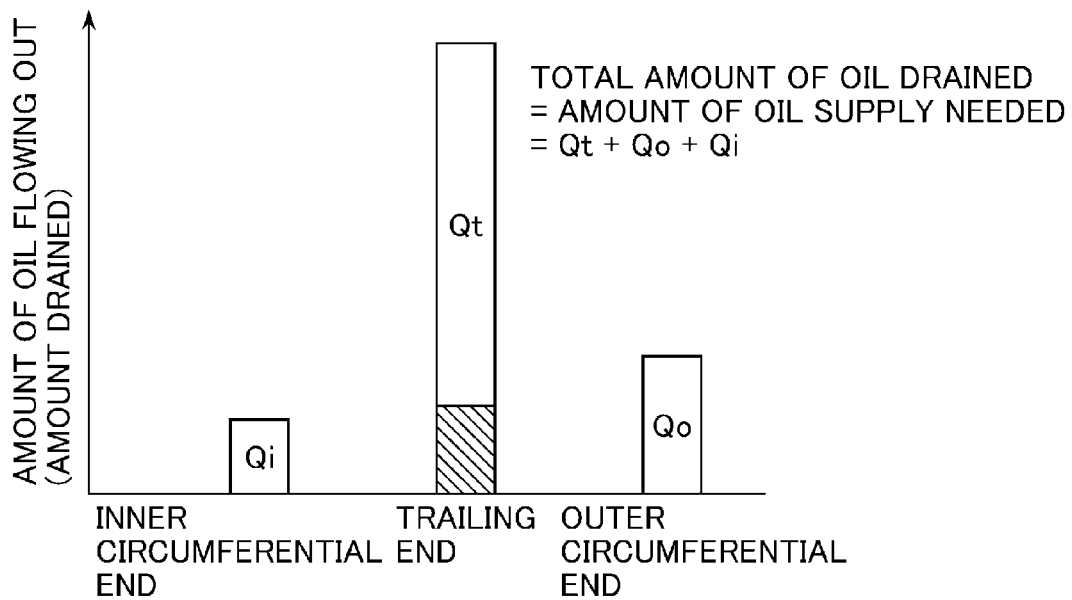
FIG. 4 is a graph illustrating the amount of oil supply according to related art.
Figure 5:
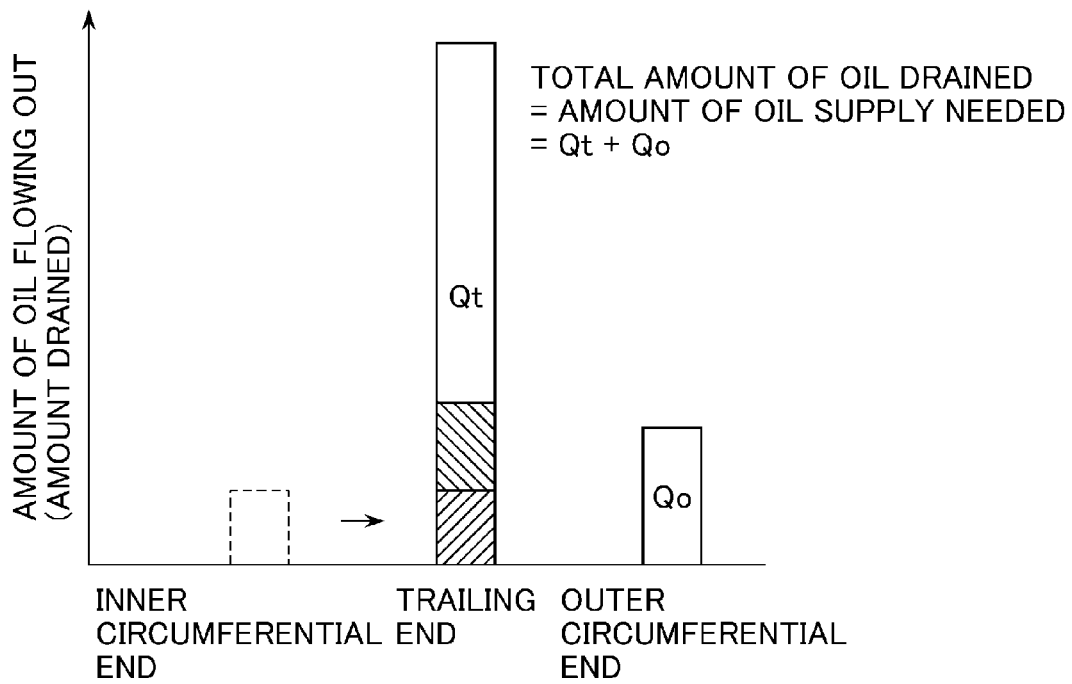
FIG. 5 is a graph illustrating the amount of oil supply according to Embodiment 1.

With reference now to FIGS. 4 and 5, the advantageous effects of Embodiment 1 are described. FIG. 4 is a graph illustrating the amount of oil supply according to related art (i.e., without the outflow guide groove 12 and the inflow guide groove 13). FIG. 5 is a graph illustrating the amount of oil supply according to Embodiment 1.

In the related art, the oil supplied to the sliding surface of a pad flows out not only from the trailing end of the pad but also from the outer and inner circumferential ends of the pad. The oil flowing out from the trailing end is partially supplied to a next downstream pad as a carry-over, and the rest is drained out of the bearing. The hatched area of FIG. 4 represents the amount of the carry-over while the non-hatched area above it represents the amount Qt of oil drained from the trailing end. The oil flowing out from the outer circumferential end is drained out of the bearing, and this amount is presented by the drained oil amount Qo. The oil flowing out from the inner circumferential end is also drained out of the bearing, and this amount is represented by the drained oil amount Qi (typically Qi<Qo). Thus, the total amount of oil drained from a pad is (Qt+Qo+Qi), which means that the same amount of oil, (Qt+Qo+Qi), needs to be supplied for the pad.

By contrast, in Embodiment 1, the outflow guide groove 12 prevents the oil from flowing out from the inner circumferential end of the pad 6 and directs the oil toward the trailing end of the pad 6 (i.e., toward the leading end of the next downstream pad 6). Moreover, the inflow guide groove 13 of the downstream pad 6 allows the oil flowing out from the outflow guide groove 12 of the upstream pad 6, which has a relatively low temperature, to be supplied onto the sliding surface of the downstream pad 6. Thus, the amount Qi of oil drained from the inner circumferential end of each pad 6 is substantially zero. As a result, the amount of oil supply needed for a pad can be reduced to (Qt+Qo).

Figure 6:
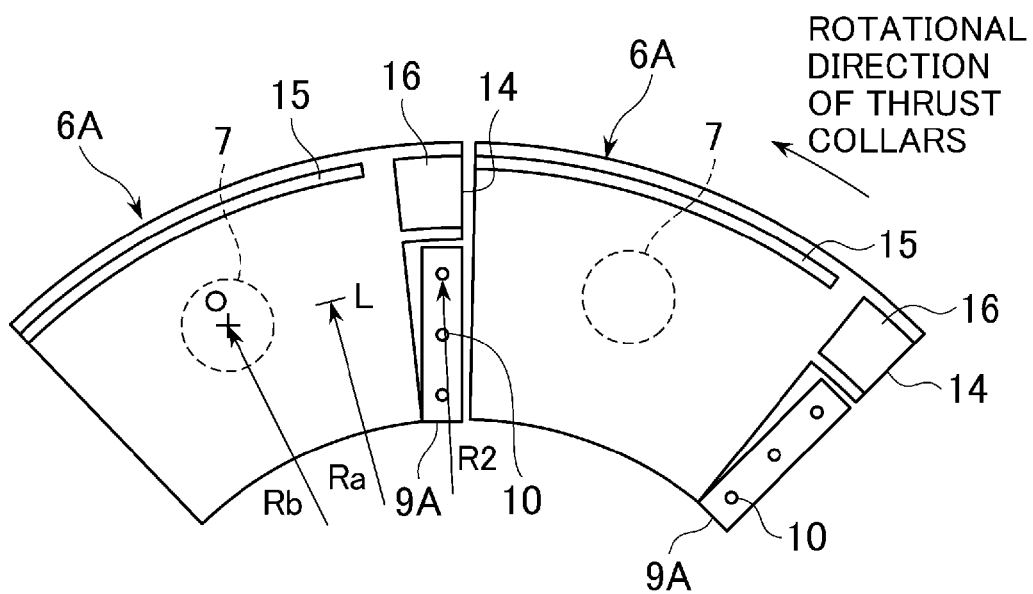
FIG. 6 illustrates the structure of pads according to Embodiment 2 of the invention.

With reference to FIG. 6, Embodiment 2 of the present invention is described below. FIG. 6 illustrates the structure of pads according to Embodiment 2. The same components as used in Embodiment 1 are assigned the same reference numerals and will not be discussed further in detail.

In the present embodiment, each oil pipe 9A is disposed at a radially inward position so as not to interfere with a leading end projection 14 located at the radially outward leading end of a pad 6A. The innermost oil inlet 10 of the oil pipe 9A is located at a radially inner position than the width-directional center L or the swaying motion center O of a pad 6A. On the other hand, the outermost oil inlet 10 is located at a radially outer position than the width-directional center L or the swaying motion center O of a pad 6A (in other words, Ra<Rb<R2 as in FIG. 6).

Each pad 6A has an outflow guide groove 15. The outflow guide groove 15 is formed near the outer circumferential edge of the sliding surface of the pad 6A (i.e., at a position closer to the outer circumferential edge than the width-directional center L) such that it extends in a circumferential direction. The outflow guide groove 15 is open to the sliding surface and the trailing end surface of the pad 6A. Each pad 6A also has an inflow guide groove 16 separated from the outflow guide groove 15. The inflow guide groove 16 is formed at the leading end projection 14 of the pad 6A (i.e., at the leading end section of the sliding surface of the pad 6A) such that it is located at a radially outer position than the oil inlets 10 of the oil pipe 9A. The inflow guide groove 16 is open to the leading end surface of the pad 6A so as to form an opening wide enough to include the same radial position as that of the opening of the outflow guide groove 15 on the trailing end surface of the pad 6A. The inflow guide groove 16 is also open to the sliding surface of the pad 6A so as to form an opening wide enough to cover a radially inner area than the radial position of the outflow guide groove 15 on the sliding surface of the pad 6A.

With this groove arrangement, part of the oil supplied to the sliding surface of a pad 6A drifts toward the outer circumferential side of the pad 6A but flows out from the trailing end of the pad 6A through the outflow guide groove 15. The oil flowing out through the outflow guide groove 15 has a relatively low temperature. In addition, the oil flowing out from the outflow guide groove 15 of an upstream pad 6A flows through the inflow guide groove 16 of a next downstream pad 6A, reaching the sliding surface of that downstream pad 6A.

Thus, in Embodiment 2, the outflow guide groove 15 prevents the oil from flowing out from the outer circumferential end of the pad 6A and directs the oil toward the trailing end of the pad 6A (i.e., toward the leading end of the next downstream pad 6A). Moreover, the inflow guide groove 16 of the downstream pad 6A allows the oil flowing out from the outflow guide groove 15 of the upstream pad 6A, which has a relatively low temperature, to be supplied onto the sliding surface of the downstream pad 6A. Thus, the amount Qo of oil drained from the outer circumferential end of each pad 6A is substantially zero. As a result, the amount of oil supply needed for a pad can be reduced to (Qt+Qi).

Figure 7:
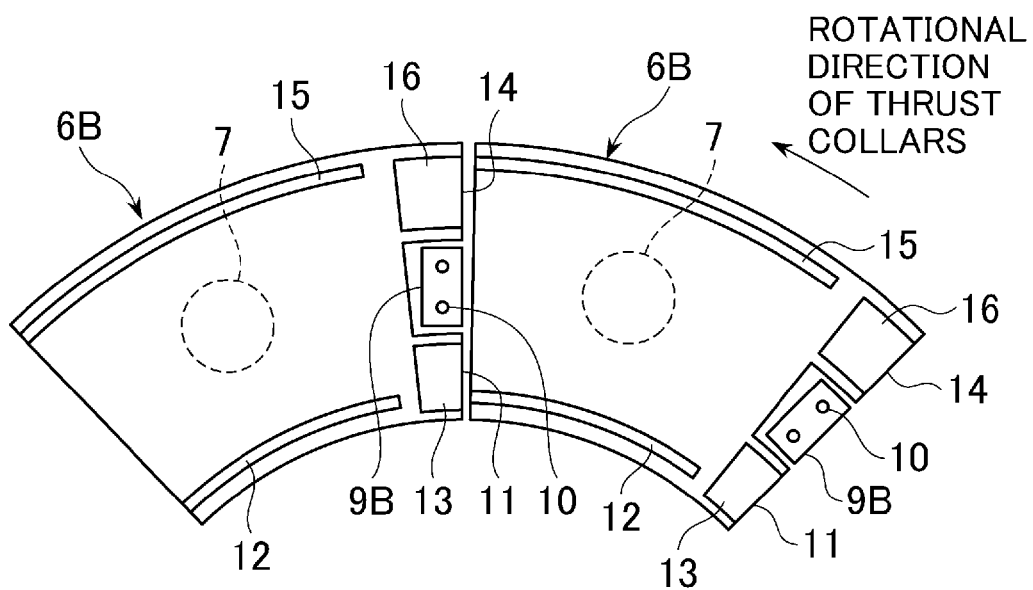
FIG. 7 illustrates the structure of pads according to Embodiment 3 of the invention.

With reference to FIG. 7, Embodiment 3 of the present invention is described below. FIG. 7 illustrates the structure of pads according to Embodiment 3. The same components as used in Embodiments 1 and 2 are assigned the same reference numerals and will not be discussed further in detail.

In the present embodiment, each oil pipe 9B is disposed between two leading end projections 11 and 14 of a pad 6B so as not to interfere with the projections. The outer oil inlet 10 of the oil pipe 9B is located at a radially outer position than the width-directional center or the swaying motion center of a pad 6B. On the other hand, the inner oil inlet 10 is located at a radially inner position than the width-directional center or the swaying motion center of a pad 6B.

Each pad 6B has an outflow guide groove 12. The outflow guide groove 12 is formed near the inner circumferential edge of the sliding surface of the pad 6B such that it extends in a circumferential direction. The outflow guide groove 12 is open to the sliding surface and the trailing end surface of the pad 6B. Each pad 6B also has an inflow guide groove 13 separated from the outflow guide groove 12. The inflow guide groove 13 is formed at the leading end projection 11 of the pad 6B such that it is located at a radially inner position than the oil inlets 10 of the oil pipe 9B. The inflow guide groove 13 is open to the leading end surface of the pad 6B so as to form an opening wide enough to include the same radial position as that of the opening of the outflow guide groove 12 on the trailing end surface of the pad 6B. The inflow guide groove 13 is also open to the sliding surface of the pad 6B so as to form an opening wide enough to cover a radially outer area than the radial position of the outflow guide groove 12 on the sliding surface of the pad 6B.

With this groove arrangement, part of the oil supplied to the sliding surface of a pad 6B drifts toward the inner circumferential side of the pad 6B but flows out from the trailing end of the pad 6B through the outflow guide groove 12. The oil flowing out through the outflow guide groove 12 has a relatively low temperature. In addition, the oil flowing out from the outflow guide groove 12 of an upstream pad 6B flows through the inflow guide groove 13 of a next downstream pad 6B, reaching the sliding surface of that downstream pad 6B.

Each pad 6B further has an outflow guide groove 15. The outflow guide groove 15 is formed near the outer circumferential edge of the sliding surface of the pad 6B such that it extends in a circumferential direction. The outflow guide groove 15 is open to the sliding surface and the trailing end surface of the pad 6B. Each pad 6B still further has an inflow guide groove 16 separated from the outflow guide groove 15. The inflow guide groove 16 is formed at the leading end projection 14 of the pad 6B such that it is located at a radially outer position than the oil inlets 10 of the oil pipe 9B. The inflow guide groove 16 is open to the leading end surface of the pad 6B so as to form an opening wide enough to include the same radial position as that of the opening of the outflow guide groove 15 on the trailing end surface of the pad 6B. The inflow guide groove 16 is also open to the sliding surface of the pad 6B so as to form an opening wide enough to cover a radially inner area than the radial position of the outflow guide groove 15 on the sliding surface of the pad 6B.

With this groove arrangement, part of the oil supplied to the sliding surface of a pad 6B drifts toward the outer circumferential side of the pad 6B but flows out from the trailing end of the pad 6B through the outflow guide groove 15. The oil flowing out through the outflow guide groove 15 has a relatively low temperature. In addition, the oil flowing out from the outflow guide groove 15 of an upstream pad 6B flows through the inflow guide groove 16 of a next downstream pad 6B, reaching the sliding surface of that downstream pad 6B.

Thus, in Embodiment 3, the outflow guide grooves 12 and 15 prevent the oil from flowing out from the inner and outer circumferential ends of the pad 6B and direct the oil toward the trailing end of the pad 6B (i.e., toward the leading end of the next downstream pad 6B). Moreover, the inflow guide grooves 13 and 16 of the downstream pad 6B allow the oil flowing out from the outflow guide grooves 12 and 15 of the upstream pad 6B, which has a relatively low temperature, to be supplied onto the sliding surface of the downstream pad 6B. Thus, the amount Qi of oil drained from the inner circumferential end of each pad 6B and the amount Qo of oil drained from the outer circumferential end of each pad 6B are both substantially zero. As a result, the amount of oil supply needed for a pad can be reduced to Qt.

Figure 8:
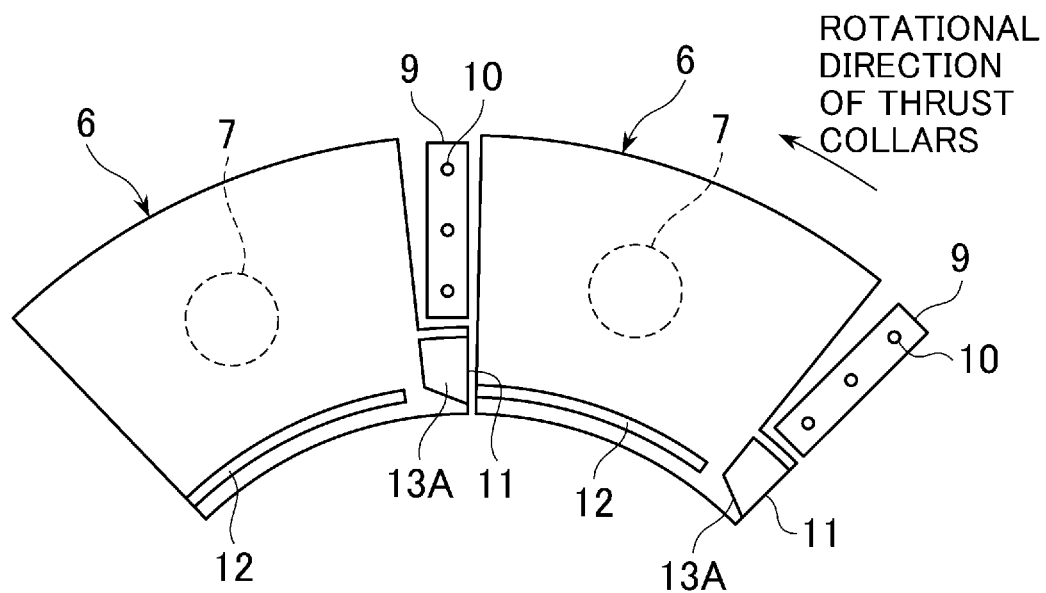
FIG. 8 illustrates the structure of pads according to an example of modified Embodiment 1 of the invention.
Figure 9:
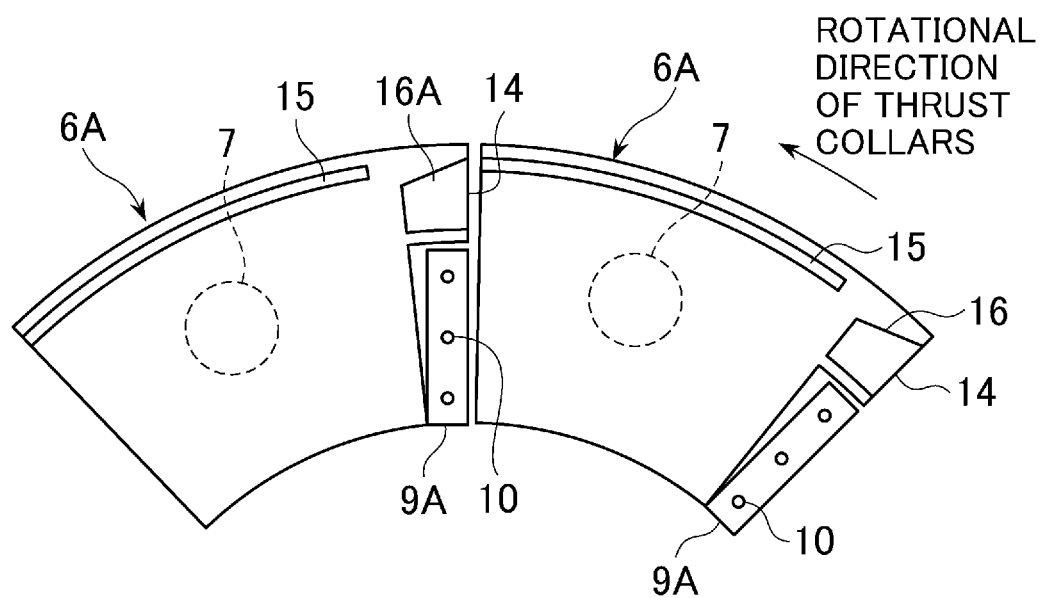
FIG. 9 illustrates the structure of pads according to an example of modified Embodiment 2 of the invention.
Figure 10:
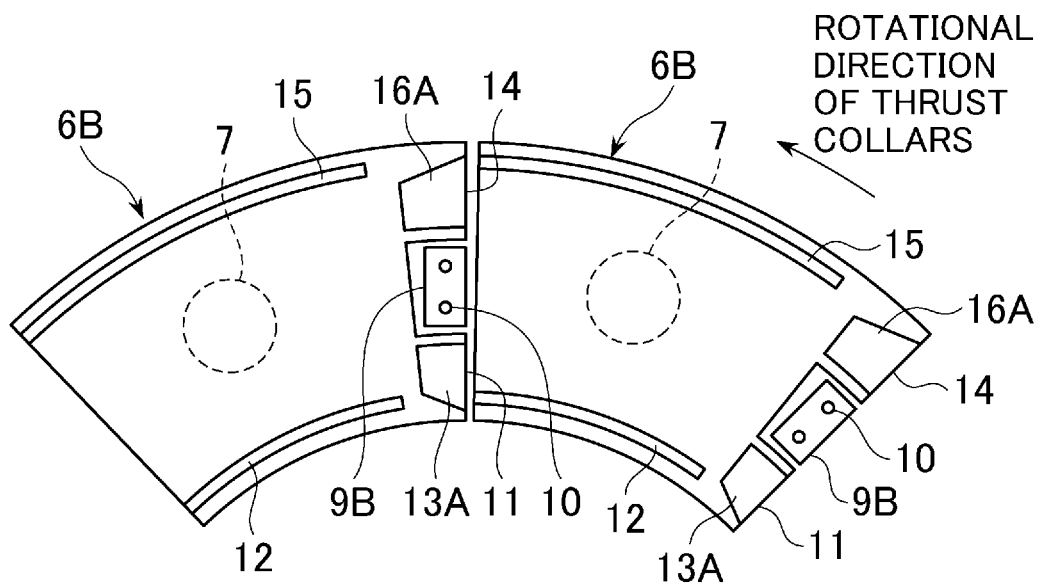
FIG. 10 illustrates the structure of pads according to an example of modified Embodiment 3 of the invention.

In Embodiments 1 and 3, each inflow guide groove 13, as illustrated, is formed such that its radially inner wall surface extends in a circumferential direction. Also, in Embodiments 2 and 3, each inflow guide groove 16, as illustrated, is formed such that its radially outer wall surface extends in a circumferential direction. The present invention, however, is not limited to such cases but can be modified without departing from the scope and spirit of the invention. For instance, as illustrated by the modification examples of FIGS. 8 and 10 in which Embodiments 1 and 3 are respectively modified, the inflow guide groove 13A of each pad can be formed such that its radially inner wall surface is tilted radially outward as going in a downstream circumferential direction. Also, as illustrated by the modification examples of FIGS. 9 and 10 in which Embodiments 2 and 3 are respectively modified, the inflow guide groove 16A of each pad can be formed such that its radially outer wall surface is tilted radially inward as going in a downstream circumferential direction. The above modifications lead to an increased amount of oil supply from the inflow guide grooves to the sliding surfaces of the pads compared with Embodiments 1 to 3. Accordingly, the amount of oil supply can be reduced further.

Figure 11:
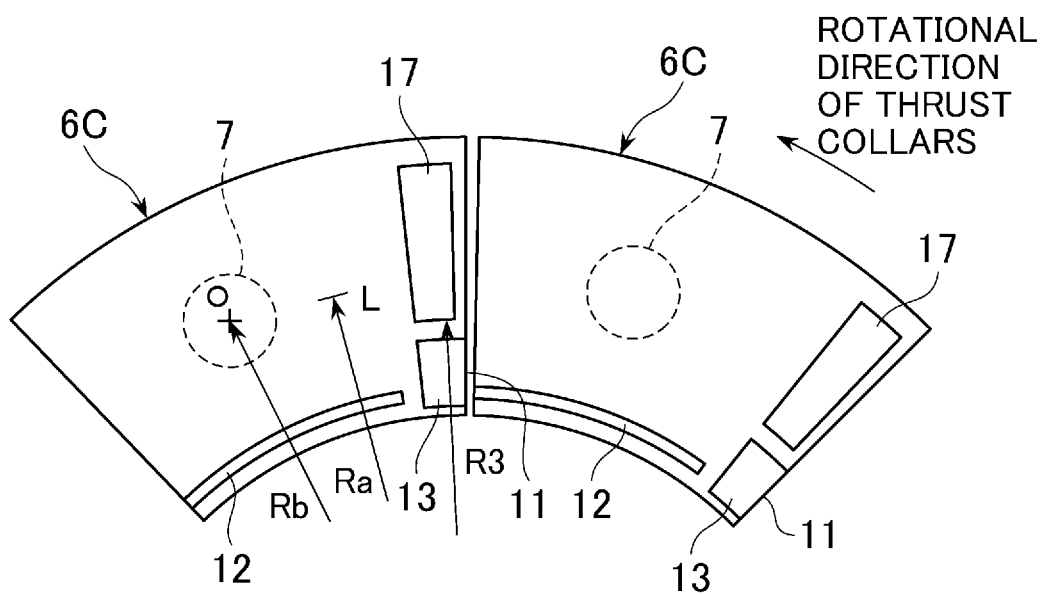
FIG. 11 illustrates the structure of pads according to another example of modified Embodiment 1 of the invention.
Figure 12:
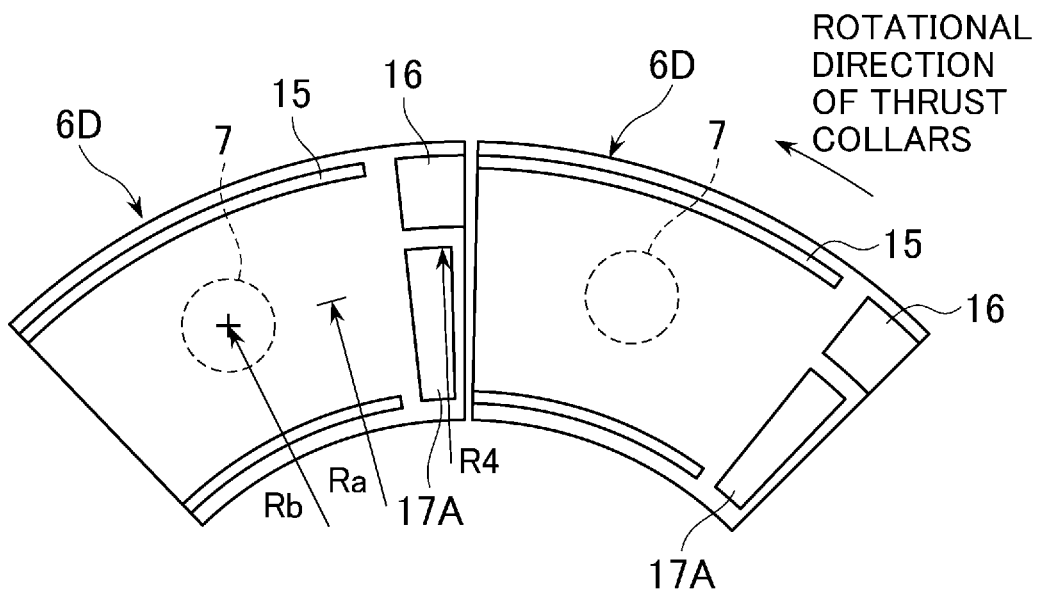
FIG. 12 illustrates the structure of pads according to another example of modified Embodiment 2 of the invention.
Figure 13:
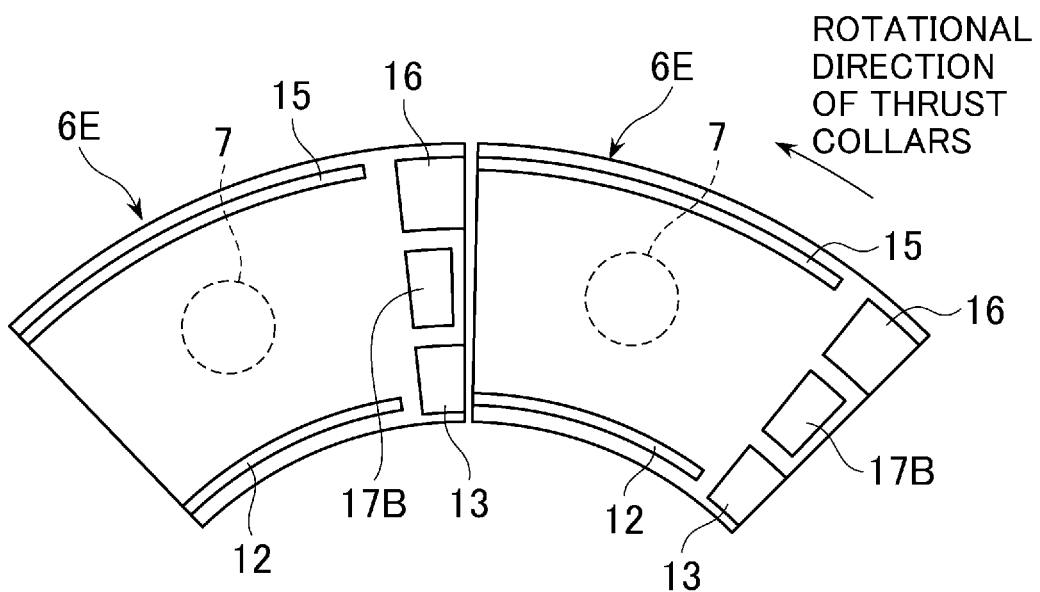
FIG. 13 illustrates the structure of pads according to another example of modified Embodiment 3 of the invention.

Further, while Embodiments 1 to 3 illustrate the case where oil pipes are disposed in spaces between pads, the invention is not limited thereto but can be modified without departing the scope and spirit of the invention. For example, as illustrated by the modification example of FIG. 11 in which Embodiment 1 is modified, an oil inlet 17 can instead be formed such that it is located radially outward near the front edge of the sliding surface of each pad 6C. The radially inner side wall of the oil inlet 17 is located at a radially inner position than the width-directional center L or the swaying motion center O of the pad 6C (i.e., R3<Ra<Rb as in FIG. 11). In this case, an inflow guide groove 13 can be formed at the front edge of the sliding surface of each pad 6C such that it is located at a radially inner position than the oil inlet 17. Further, as illustrated by the modification example of FIG. 12 in which Embodiment 2 is modified, an oil inlet 17A can instead be formed such that it is located radially inward near the front edge of the sliding surface of each pad 6D. The radially outer side wall of the oil inlet 17A is located at a radially outer position than the width-directional center L or the swaying motion center O of the pad 6D (i.e., Ra<Rb<R4 as in FIG. 12). In this case, an inflow guide groove 16 can be formed at the front edge of the sliding surface of each pad 6C such that it is located at a radially outer position than the oil inlet 17A. Moreover, as illustrated by the modification example of FIG. 13 in which Embodiment 3 is modified, an oil inlet 17B can instead be formed such that it is located radially centrally near the front edge of the sliding surface of each pad 6E. The radially inner side wall of the oil inlet 17B is located at a radially inner position than the width-directional center or the swaying motion center of the pad 6E while the radially outer side wall of the oil inlet 17B is located at a radially outer position than the width-directional center or the swaying motion center of the pad 6E. In this case, an inflow guide groove 13 can be formed at the front edge of the sliding surface of each pad 6E such that it is located at a radially inner position than the oil inlet 17B while an inflow guide groove 16 can be formed at the front edge of the sliding surface of each pad 6E such that it is located at a radially outer position than the oil inlet 17B. In the above modifications as well, the same advantageous effects as those of Embodiments 1 to 3 can be obtained.

Figure 14:
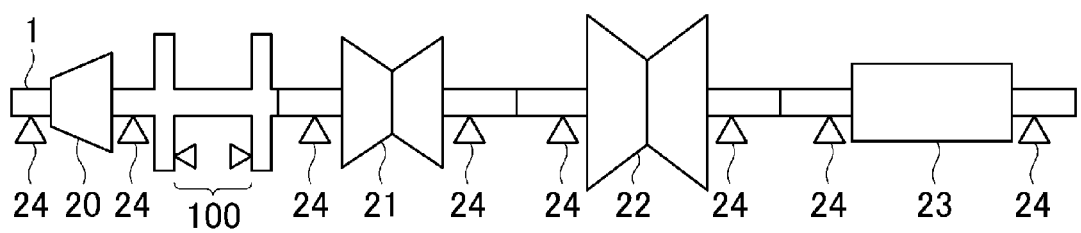
FIG. 14 illustrates the structure of a steam turbine in which a tilting-pad thrust baring according to the invention is adopted.

With reference now to FIG. 14, an example of a rotary machine having the foregoing tilting-pad thrust bearing 100 is described. FIG. 14 illustrates the structure of a steam turbine having the tilting-pad thrust bearing 100.

As illustrated, the steam turbine includes a high-pressure turbine 20, a medium-pressure turbine 21, and a low-pressure turbine 22 to receive different steam pressures. These turbines 20, 21, and 22 are connected to a generator 23 via a rotary shaft 1. The steam turbine also includes multiple journal bearings 24 for receiving the radial load of the rotary shaft 1 and the thrust bearing 100 for receiving the axial load of the rotary shaft 1.

In such a steam turbine, auxiliary equipment and related components for oil supply (pumps, pipes, etc.) can be reduced in size since the amount of oil supply to the thrust bearing 100 is smaller. Accordingly, the steam turbine can also be made compact.

In the above example, the rotary shaft 1 extends horizontally, and the tilting-pad thrust bearing 100 receives the axial load of the rotary shaft 1 via a pair of thrust collars 2. The present invention, however, is not limited to such a case but can be modified without departing from the scope and spirit of the invention. For instance, the rotary shaft 1 can instead extend vertically, and the tilting-pad thrust bearing 100 can receive the axial load of the rotary shaft 1 via one thrust collar. In this case as well, the same advantageous effects as those of the above example can be obtained.

What is claimed is:

1. A tilting-pad thrust bearing for supporting the axial load of a rotary shaft via a thrust collar fixed to the outer circumferential side of the rotary shaft, the bearing comprising:
   a plurality of pads swayably disposed on the outer circumferential side of the rotary shaft so as to face the thrust collar;
   a plurality of oil inlets disposed in spaces between the plurality of pads or at leading end sections of sliding surfaces of the pads;
   a plurality of outflow guide grooves formed on the sliding surfaces of the pads and each located at a position closer to an inner circumferential edge of the sliding surface of the pad than a width-directional center of the sliding surface of the pad such that the plurality of outflow guide grooves extend in a circumferential direction; and
   a plurality of inflow guide grooves provided separately from the plurality of outflow guide grooves and formed at the leading end sections of the sliding surfaces of the pads so as to be located more radially inward than the plurality of oil inlets,
   wherein each of the outflow guide grooves is open to the sliding surface and a trailing end surface of the pad,
   wherein each of the inflow guide grooves is open to a leading end surface of the pad so as to form an opening wide enough to include the same radial position as that of the opening of the outflow guide groove on the trailing end surface of the pad, and
   wherein each of the inflow guide grooves is also open to the sliding surface of the pad so as to form an opening wide enough to cover a radially outer area than the radial position of the outflow guide groove on the sliding surface of the pad.

2. The bearing of claim 1 wherein the plurality of oil inlets, located more radially outward than the plurality of inflow guide grooves, include oil inlet parts each located more radially outward than the width-directional center or a swaying motion center of the pad and oil inlet parts each located more radially inward than the width-directional center or the swaying motion center of the pad.

3. The bearing of claim 1 wherein each of the inflow guide grooves is formed such that a radially inner wall surface thereof is tilted radially outward as going in a downstream circumferential direction.

4. A rotary machine comprising the tilting-pad thrust bearing of claim 1.

5. The rotary machine of claim 4 wherein the rotary machine is a steam turbine.

6. A tilting-pad thrust bearing for supporting the axial load of a rotary shaft via a thrust collar fixed to the outer circumferential side of the rotary shaft, the bearing comprising:

a plurality of pads swayably disposed on the outer circumferential side of the rotary shaft so as to face the thrust collar;

a plurality of oil inlets disposed in spaces between the plurality of pads or at leading end sections of sliding surfaces of the pads;

a plurality of outflow guide grooves formed on the sliding surfaces of the pads and each located at a position closer to an outer circumferential edge of the sliding surface of the pad than a width-directional center of the sliding surface of the pad such that the plurality of outflow guide grooves extend in a circumferential direction; and a plurality of inflow guide grooves provided separately from the plurality of outflow guide grooves and formed at the leading end sections of the sliding surfaces of the pads so as to be located more radially outward than the plurality of oil inlets, wherein each of the outflow guide grooves is open to the sliding surface and a trailing end surface of the pad, wherein each of the inflow guide grooves is open to a leading end surface of the pad so as to form an opening wide enough to include the same radial position as that of the opening of the outflow guide groove on the trailing end surface of the pad, and wherein each of the inflow guide grooves is also open to the sliding surface of the pad so as to form an opening wide enough to cover a radially inner area than the radial position of the outflow guide groove on the sliding surface of the pad.

7. The bearing of claim 6 wherein the plurality of oil inlets, located more radially inward than the plurality of inflow guide grooves, include oil inlet parts each located more radially inward than the width-directional center or a swaying motion center of the pad and oil inlet parts each located more radially outward than the width-directional center or the swaying motion center of the pad.

8. The bearing of claim 6 wherein each of the inflow guide grooves is formed such that a radially outer wall surface thereof is tilted radially inward as going in a downstream circumferential direction.

9. A tilting-pad thrust bearing for supporting the axial load of a rotary shaft via a thrust collar fixed to the outer circumferential side of the rotary shaft, the bearing comprising:

a plurality of pads swayably disposed on the outer circumferential side of the rotary shaft so as to face the thrust collar;

a plurality of oil inlets disposed in spaces between the plurality of pads or at leading end sections of sliding surfaces of the pads;

a plurality of first outflow guide grooves formed on the sliding surfaces of the pads and each located at a position closer to an inner circumferential edge of the sliding surface of the pad than a width-directional center of the sliding surface of the pad such that the plurality of first outflow guide grooves extend in a circumferential direction;

a plurality of first inflow guide grooves provided separately from the plurality of first outflow guide grooves and formed at the leading end sections of the sliding surfaces of the pads so as to be located more radially inward than the plurality of oil inlets;

a plurality of second outflow guide grooves formed on the sliding surfaces of the pads and each located at a position closer to an outer circumferential edge of the sliding surface of the pad than the width-directional center of the sliding surface of the pad such that the plurality of second outflow guide grooves extend in a circumferential direction; and a plurality of second inflow guide grooves provided separately from the plurality of second outflow guide grooves and formed at the leading end sections of the sliding surfaces of the pads so as to be located more radially outward than the plurality of oil inlets, wherein each of the first outflow guide grooves is open to the sliding surface and a trailing end surface of the pad, wherein each of the first inflow guide grooves is open to a leading end surface of the pad so as to form an opening wide enough to include the same radial position as that of the opening of the first outflow guide groove on the trailing end surface of the pad, wherein each of the first inflow guide grooves is also open to the sliding surface of the pad so as to form an opening wide enough to cover a radially outer area than the radial position of the first outflow guide groove on the sliding surface of the pad, wherein each of the second outflow guide grooves is open to the sliding surface and the trailing end surface of the pad, wherein each of the second inflow guide grooves is open to the leading end surface of the pad so as to form an opening wide enough to include the same radial position as that of the opening of the second outflow guide groove on the trailing end surface of the pad, and wherein each of the second inflow guide grooves is also open to the sliding surface of the pad so as to form an opening wide enough to cover a radially inner area than the radial position of the second outflow guide groove on the sliding surface of the pad.

10. The bearing of claim 9 wherein the plurality of oil inlets, located more radially outward than the plurality of first inflow guide grooves and more radially inward than the plurality of second inflow guide grooves, include oil inlet parts each located more radially outward than the width-directional center or a swaying motion center of the pad and oil inlet parts each located more radially inward than the width-directional center or the swaying motion center of the pad.

11. The bearing of claim 9 wherein each of the first inflow guide grooves is formed such that a radially inner wall surface thereof is tilted radially outward as going in a downstream circumferential direction and wherein each of the second inflow guide grooves is formed such that a radially outer wall surface thereof is tilted radially inward as going in a downstream circumferential direction.

* * * * *